Jan. 7, 1958      E. S. WUERTZ      2,818,740
SPEED CHANGING MECHANISM OF THE FRICTION TYPE
Filed Aug. 17, 1955
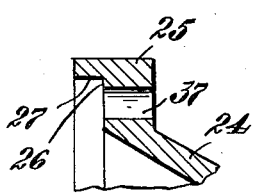
Fig. 3
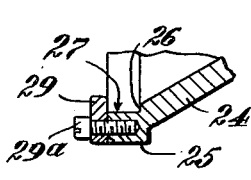
Fig. 4
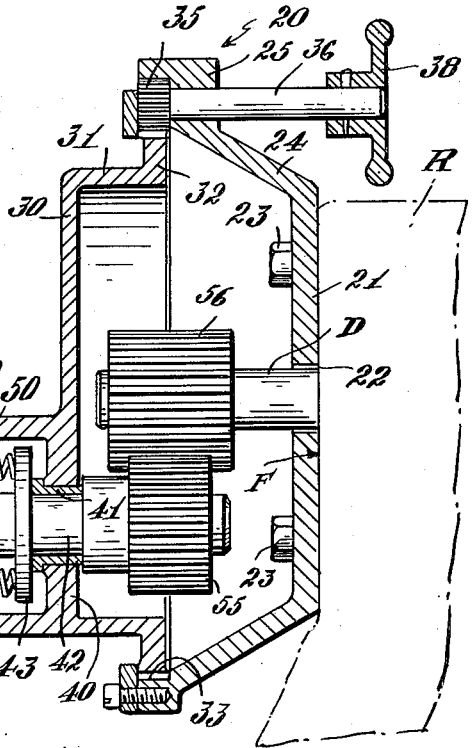
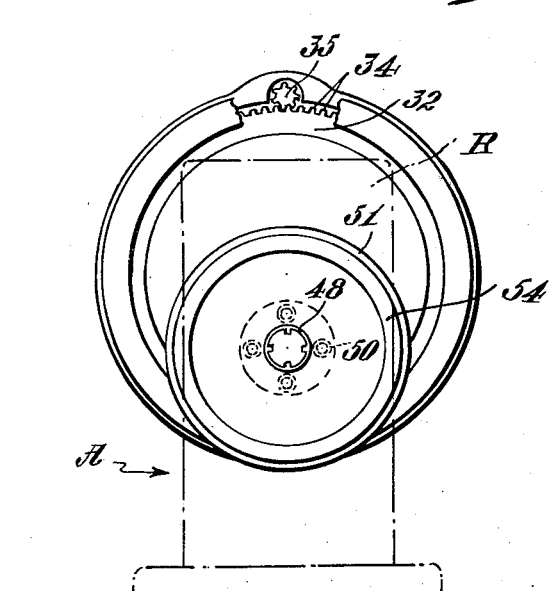
Fig. 1
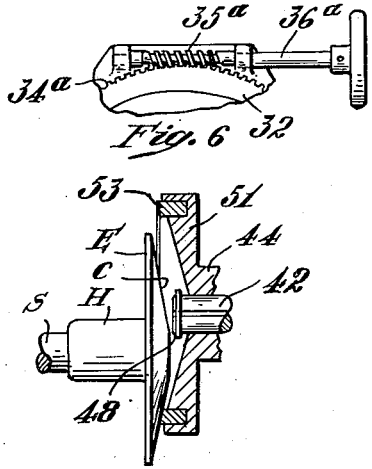
Fig. 6
Fig. 2
Fig. 5
Inventor
Emil S. Wuertz
by Roberts Cushman & Grover
Attys

United States Patent Office 2,818,740
Patented Jan. 7, 1958

2,818,740

SPEED CHANGING MECHANISM OF THE FRICTION TYPE

Emil S. Wuertz, Quincy, Mass., assignor to The Murray Company of Texas, Inc., Dallas, Tex., a corporation of Delaware Application August 17, 1955, Serial No. 528,918

4 Claims. (Cl. 74—191)

This invention pertains to speed changing mechanism of the friction type wherein two circular friction elements may be coaxially arranged to engage in the manner of a friction clutch thereby to provide the maximum speed, or alternatively may be relatively arranged so that their axes are parallel but spaced apart and the contact between the friction elements takes place only at limited eccentrically located areas whose radial distances from the axes of the two elements are unequal, thereby providing for a high range of different speeds less than the maximum speed.

The present invention has for its object the provision of a speed changer of the above type, which is simple and inexpensive but durable and reliable in operation, and which affords a wide range of speeds. A further object is to provide a speed changer of the above type which may, if desired, be supported by the machine whose shaft is to be driven. A further object is to provide a speed changer of the above type wherein the variation in speed may be made without stopping the apparatus, and wherein this change in speed may be brought about by the operation of simple manually actuable means. Other and further objects and advantages of the invention will be pointed out in the following more detailed description and by reference to the accompanying drawings, wherein Fig. 1 is a sectional view, partly in elevation, illustrating speed changer means embodying the present invention interposed between a power source, for example, the shaft of an electric motor and the shaft of a machine to be driven, the section being in a vertical radial plane of the driven shaft and showing the apparatus arranged for maximum speed;

Fig. 2 is an elevation looking from the left-hand side of Fig. 1, omitting the driving friction element and the shaft on which it is mounted;

Fig. 3 is a fragmentary section, on the same plane as Fig. 1, showing the upper portion of the fixed member of the casing of the speed changer and omitting other parts;

Fig. 4 is a fragmentary section similar to Fig. 3 but showing the lower portion of the fixed member of the casing, and a retaining ring by means of which the movable part of the casing is held assembled with the fixed part;

Fig. 5 is a fragmentary section, showing the friction elements eccentrically disposed; and Fig. 6 is a fragmentary section illustrating a slight modification.

Referring to the drawings, the character M designates an electric motor or other source of power having the drive shaft S. The shaft S of the drive motor has attached thereto a hub H integral with a friction driving element E having the conical right-hand surface C, which constitutes the driving face of this friction element.

The character A designates apparatus which is to be driven by the motor M through the intermediary of the speed changing mechanism of the present invention, this apparatus being shown as having the frame or casing R provided at its left-hand side, as seen in Fig. 1, with a flat vertical face F. This apparatus A has the shaft D which is to be driven by the speed changing apparatus.

The speed changing apparatus of the present invention comprises the casing 20, which includes a base portion having the circular rear wall 21, here shown as vertical, provided with a central opening 22 through which the shaft D enters the casing. The wall 21 is provided with openings for the reception of bolts 23, or other devices for attaching it to the face of the frame R of the apparatus A. The base or fixed member of the casing also comprises the flaring side wall 24, thus providing a dish-like part, which terminates in the flange 25, the latter, as shown more particularly in Figs. 3 and 4, having an annular vertical surface 26 and cylindrical peripheral surface 27, these surfaces, in cooperation with the inner radial surface of a retaining ring 29, secured to the flange 25 by bolts 29ª, defining an annular channel or guideway coaxial with the center of the opening 22 in the wall 21 of the base member.

The casing also comprises the rotatable cover comprising the wall 30 which is parallel with the wall 21 of the base portion of the casing, this wall 30 merging with the cylindrical side wall 31, which in turn merges with a radial flange 32 having a peripheral surface 33 which engages the cylindrical surface 27 of the guide groove or channel above referred to. The surface 33 extends unbroken throughout the major portion of the circumference of the flange 32, but throughout an arc of approximately 60° it is provided with gear teeth 34 forming a segmental gear. These gear teeth are designed to engage a pinion 35 fixed to a shaft 36 which turns in a bearing opening 37 (Fig. 3) in the flange 25, this shaft being provided with a hand wheel 38 by means of which it may be rotated. By turning this hand wheel the rotatable cover 30 may be turned throughout an arc corresponding to the length of the segmental gear constituted by the teeth 34. Obviously, equivalent means may be provided for turning the cover. For example, Fig. 6, the spur gear teeth 34 may be replaced by worm teeth 34ª, and the pinion 35 replaced by a worm 35ª, the axis of whose shaft 36ª would be at right angles to the axis of the pinion 35, such an arrangement providing an automatic lock for the parts and also requiring less space.

The rotatable cover is provided with a tubular boss 39 projecting outwardly from the wall 30, the axis of this tubular boss being parallel to the axis of the opening 22 but radially spaced from the latter. The wall 30 is thickened at the part from which the boss 39 projects, as shown at 40 (Fig. 1) and this thickened portion of the wall is provided with an opening which receives a bearing 41 in which a transmission shaft 42 is arranged to turn. One end portion of this transmission shaft is located within the chamber formed by the assembled casing parts, while its opposite end portion extends outwardly from the tubular boss 39. The shaft 42 is provided, adjacent to the bearing 41, with a radial flange 43. A tubular hub member 44 is arranged to slide within the boss 39, the latter having a sleeve bearing at 45 for the rotary hub 44 and which also facilitates the sliding of the hub 44 in an axial direction. The hub 44 is provided with a bearing at 46 for engagement with the transmission shaft 42, the hub being splined to the shaft 42, as shown at 47, so that it may slide axially relatively to the shaft but cannot turn relatively to the shaft. At its outer end the shaft 42 is furnished with a retaining ring 48 which limits axial movement of the hub 44 away from the casing. The hub 44 is of substantial thickness in a radial direction and is provided, within the thickness of its wall, with a plurality of axially extending bores 49, each of which houses one end of a compression spring 50. The right-hand ends of these springs, as viewed in Fig. 1, abut the flange 43, the springs thus urging the hub 44 away from the casing.

The hub 44 is provided with a radial flange portion 51 which constitutes the driven friction element of the speed changer. As illustrated in Fig. 1, the left-hand face 52 of this element 51 is of concave, conical contour complemental to the conical face C of the driving friction element E. Desirably, and as here illustrated, the element 51 is provided with an annular groove 53 coaxial with the shaft 42, which receives a ring 53 of suitable friction material, for example, some rubber compound, whose outer surface preferably has the same inclination as the surface C and which forms the only contact between the friction elements E and 51.

The shaft 42 is provided within the casing with a pinion 55 which is designed to mesh with a pinion 56 here shown as of the same pitch diameter as pinion 53 and which is mounted on the shaft D of the apparatus to be driven. However, to obtain additional speed reduction, pinion 55 could be of lesser diameter than pinion 56.

As illustrated in Fig. 1, the parts are so disposed that the friction elements E and 51 are coaxial. In this position, the ring 53 makes contact with the surface C over an arc of 360°, and since the shafts S and 42 are now coaxial, and as the pinions 55 and 56 are of equal pitch diameter, the shafts S and D will turn at the same speed. If it be desired to reduce the speed of the shaft D, the hand wheel 38 may be turned, thus turning the cover 30 and swinging the shaft 42 bodily about the axis of the shaft D. This likewise moves the friction element 51 so that the ring 53 now no longer contacts the cone member E over 360° of arc. Under these circumstances, the area of contact between the ring 53 and the conical surface C will be located nearer the axis of the shaft S, and thus the disk 51 will turn at a slower speed than the member E, thus driving the shaft D at a speed less than that of the shaft S. The arrangement of parts is such that if desired, the area of contact of the ring 53 with the surface C may be close to the center of the latter surface, thus reducing the speed very substantially as compared with the original speed.

It may be noted that this change in speed may be accomplished while the apparatus is in operation, and that as the part 51 is moved toward or from concentric position with respect to the part E the springs 50 will maintain contact between the ring 53 and the surface C, thus assuring a constant and reliable friction drive.

Since all of the operative parts of the speed changing apparatus, other than the conical drive member E, are supported by the casing, it is evident that the speed changing device may be supported, as illustrated in Fig. 1, by the machine which is to be driven, which is a matter of convenience in installation, as well as resulting in a saving of space as compared with apparatus which must be supported independently of the machine which is to be driven. While an electric motor has been mentioned as the device for driving the shaft S, it is clear that other means, for example a belt and pulley drive, may be employed, and while the annular gear 34 has been indicated as extending through only approximately 60° of arc, it is evident that it may be of greater or lesser extent as desired.

The apparatus is very simple and rugged in construction, comprising parts which are easily manufactured and assembled, thus reducing the cost to a minimum while providing a very wide range of speeds.

One desirable embodiment of the invention has herein been illustrated by way of example, but it is to be understood that the invention is broadly inclusive of any and all modifications and equivalents which fall within the scope of the appended claims.

I claim:

1. In combination with a driven shaft having a pinion fixed thereto, a rotatable support coaxial with the driven shaft, the support carrying bearings for a transmission shaft whose axis is parallel to and radially spaced from that of the driven shaft, means preventing axial motion of the transmission shaft relatively to the driven shaft, a pinion fixed to the transmission shaft near one end of the latter and which constantly meshes with the pinion on the driven shaft, a driving shaft whose axis is parallel to that of the driven shaft, a conical friction drive element fixed to the driving shaft, a complemental driven, conical friction element splined to slide axially along the transmission shaft and which constantly contacts the friction driving element so as to be driven by the latter, the rotatable support having a hollow boss coaxial with the transmission shaft and into which the latter projects, the driven, conical friction element having an elongate thick-walled hub which slides within said hollow boss, the hub having an elongate, tubular bearing for the transmission shaft and having axially extending bores within the thickness of its wall, coiled compression springs seated in said bores and which are so constructed and arranged as constantly to urge the driven friction element in an axial direction away from the rotatable support, means to limit such axial motion, and means for turning the support about the axis of the driven shaft thereby to vary the eccentricity of the transmission shaft relatively to the driving shaft.

2. A combination with apparatus comprising a frame which supports a shaft to be driven, a casing which includes a dished base member fixed to said frame, said fixed base member having a rim provided with an annular guideway coaxial with the driven shaft, a rotatable casing member having an annular peripheral portion which fits in and is held within said guideway, the fixed casing member and the rotatable casing member being so relatively shaped as to define an interior chamber into which the driven shaft projects, a pinion fixed to the driven shaft within said chamber, the rotatable casing member having a bearing for a transmission shaft whose axis is parallel to that of the driven shaft but radially spaced from the latter, a transmission shaft turning in said bearing, means operative to prevent axial motion of the transmission shaft, one end of the transmission shaft being located within said chamber, a pinion fixed to the latter end of said transmission shaft and which constantly meshes with the pinion on the driven shaft, a driven friction element splined to the transmission shaft and located outside of said chamber, means limiting axial motion of the driven friction element in the direction away from the casing, a driving friction element which constantly engages the driven friction element for driving the latter, springs which constitute the sole means for maintaining driving contact between the friction elements and which constantly urge the driven friction element away from the casing, a shaft whose axis is parallel to that of the driven shaft and to which the driving friction element is fixed, means for turning said latter shaft, and means for turning the rotatable casing member thereby to vary the radial distance between the axis of the shaft which carries the driving friction element and the axis of the transmission shaft.

3. A speed changer comprising a casing which includes a base having provision for securing it to a fixed part of a machine frame, the base having a circular, marginal guideway and a central aperture through which a shaft of the machine may project into the casing, the casing also comprising a rotatable cover member having an annular portion which fits in and is held within said circular guideway, the fixed base and rotatable cover member being so relatively shaped that when assembled they defined an interior chamber designed to form a housing for a pinion fixed to the shaft of the machine, the rotatable cover member being provided with a bearing for a transmission shaft one end of which is disposed within said chamber and to which a pinion is fixed which constantly meshes with the pinion on the machine shaft, means operative to prevent axial motion of the transmission shaft, an elongate hub member splined to slide on the other end portion of the transmission shaft which is located outside of said chamber, a friction element fixed to said hub, said friction element having a conical concavity in its outer face, means limiting axial motion of the hub in a direction away from the casing, spring means urging the hub away from the casing, a shaft whose axis is parallel to that of the transmission shaft, a conical friction drive element, complemental to the aforesaid friction element and which constantly engages the latter, means for rotating said second-named conical drive element, and means for turning the rotatable portion of the casing thereby to vary the eccentricity of the axis of the transmission shaft relaitvely to that of the driving friction element.

4. A speed reducer comprising in combination a casing including a base designed to be fixed to the frame of a machine having a shaft which is to be driven, said base being circular and having a flat central wall portion, said flat wall portion having a central aperture for the passage of the machine shaft which is to be driven, the base also having a flaring side wall provided at its outer edge with an annular guideway concentric with said central aperture, the casing also including a rotatable cover having a flat wall portion and cylindrical side wall, the flat wall portion of the cover being parallel to and spaced from the flat wall portion of the base, the side wall of the cover having a marginal, radial, annular flange which fits into and is held within the guideway of the base portion, the assembled base and cover defining a closed interior chamber, the flange of the cover carrying a segmental gear coaxial with the shaft to be driven, a pinion meshing with said segmental gear, and means for turning the pinion thereby to rotate the cover relatively to the base portion of the casing, the cover having a hollow boss projecting outwardly from its flat wall portion, said latter wall portion having therein a bearing opening coaxial with the boss, a bearing within said opening, a transmission shaft turning in said bearing and having one end disposed within said chamber, the major portion of the length of the transmission shaft being within the boss, means preventing axial motion of the transmission shaft, said transmission shaft being eccentric with reference to the axis of the shaft to be driven, pinions within said chamber which constantly mesh with each other, one of said pinions being fixed to the transmission shaft and the other to the shaft to be driven, an elongate, tubular hub member, slidable axially within said boss and having an axial bore for the reception of the outer end portion of the transmission shaft, the hub being splined to the latter shaft and carrying a driven friction element, spring means constantly urging said driven friction element away from the casing, a driving shaft whose axis is parallel to that of the shaft to be driven, and a driving friction element fixed to the driving shaft and which constantly engages the driven friction element thereby to turn the latter.

References Cited in the file of this patent

UNITED STATES PATENTS

| | | |
|---|---|---|
| 1,879,508 | Robertson | Sept. 27, 1932 |
| 2,139,560 | Olson | Dec. 6, 1938 |

FOREIGN PATENTS

| | | |
|---|---|---|
| 835,678 | Germany | Apr. 3, 1952 |
| 903,649 | France | Jan. 29, 1945 |
| 905,768 | France | Apr. 30, 1945 |